United States Patent [19]
Drewery

[11] Patent Number: 5,266,239
[45] Date of Patent: Nov. 30, 1993

[54] DIFFUSER ASSEMBLY FOR AN AERATION SYSTEM OF A WASTEWATER TREATMENT PLANT

[76] Inventor: T. Gig Drewery, P.O. Box 426, Kountze, Tex. 77625-0426

[21] Appl. No.: 900,012

[22] Filed: Jun. 17, 1992

[51] Int. Cl.⁵ .............................................. B01F 3/04
[52] U.S. Cl. .............................. 261/64.3; 261/122.1; 137/854
[58] Field of Search ................. 261/64.3, 122.1, 122.2; 137/854

[56] References Cited

U.S. PATENT DOCUMENTS

| | | | |
|---|---|---|---|
| 1,283,993 | 11/1918 | Wallace et al. | 261/64.3 |
| 1,920,719 | 8/1933 | Stich | 261/122.1 |
| 2,373,046 | 4/1945 | Osborn, Jr. | 137/854 |
| 3,519,012 | 7/1970 | Van Patten | 137/854 |
| 3,608,834 | 9/1971 | MacLaren | 137/854 |
| 3,650,405 | 3/1972 | Morrison | 261/122.1 |
| 3,956,432 | 5/1976 | Hilling | 261/122.1 |
| 3,983,857 | 10/1976 | O'Connor | 137/854 |
| 4,070,423 | 1/1978 | Pierce | 261/122.1 |
| 4,229,832 | 10/1980 | Dickson, Sr. | 137/854 |
| 4,512,934 | 4/1985 | Bucher | 261/64.3 |
| 4,735,607 | 4/1988 | Keith, Jr. | 137/854 |
| 5,030,362 | 7/1991 | Da Silva et al. | 261/122.1 |

FOREIGN PATENT DOCUMENTS

| | | | |
|---|---|---|---|
| 134927 | 10/1949 | Australia | 261/122 |
| 1955545 | 6/1979 | Fed. Rep. of Germany | 261/64.3 |

*Primary Examiner*—Tim Miles
*Attorney, Agent, or Firm*—Harrison & Egbert

[57] ABSTRACT

An aeration apparatus for a wastewater treatment plant having an air line connected to an air source, a drop line connected in fluid communication with the air line, a check valve positioned in the drop line between an orifice at the bottom of the drop line and the air line, and a diffuser member extending around the orifice on the drop line. The check valve serves to prevent liquid from passing therethrough. The drop line includes a tube which extends downwardly from the air line, an upper adapter fastened to an end of the tube opposite the air line, and a lower adapter engaging the upper adapter in fluid communication with said tube. The upper adapter is a male threaded member and the lower adapter is a female threaded member. The check valve is affixed within the lower adapter adjacent to the female threads. The check valve includes a disk having a plurality of holes extending therethrough and a resilient flap valve extending over the holes and juxtaposed against the disk.

15 Claims, 3 Drawing Sheets

DIFFUSER ASSEMBLY FOR AN AERATION SYSTEM OF A WASTEWATER TREATMENT PLANT

TECHNICAL FIELD

The present invention relates to diffusers for aeration systems. More particularly, the present invention relates to check valves as used on diffuser assemblies.

BACKGROUND ART

Recently, home wastewater treatment systems have become increasingly popular. Prior to the development of home wastewater treatment systems, septic tanks were the conventional manner of cleaning home and small commercial establishment wastes from the water. In view of the great cost associated with connecting a home sewage system with the city sewage system, it is economically beneficial to employ the use of home wastewater treatment systems. Present home wastewater treatment systems are a down-sized, underground version of the treatment processes employed by large central treatment plants.

Essentially, the treatment process correlates with an example found in nature. When a creek runs through rocks and over logs, turbulence is created and oxygen is captured. Aerobic bacteria utilize oxygen in their digestion processes. This allows the creek to purify itself. The home wastewater treatment systems simply employ a speeded-up version of this process in a manner known as "extended aeration". Air or oxygen is brought in by means of an efficient air pump and then diffused into thousands of tiny air bubbles by means of fine air diffusion. As these tiny bubbles move upward through the wastewater, oxygen is captured and the same purification process takes place. Such a system can allow normal household waste water to be reduced to a clear odorless liquid.

One such system has been manufactured and sold by Hydro-Flo Wastewater Treatment Systems, Inc. of P.O. Box 426, Kountze, Tex. The system is known as the "HYDRO-FLO" System. It is a self-contained automatic system. The HYDRO-FLO System incorporates two separate compartments, each performing a specific function in the digestion process. First, raw waste water enters the aeration compartment and is mixed with activated sludge and aerated. An air pump injects large quantities of air into this compartment by means of porous ceramic diffusers located above the perimeter of the aeration compartment. These diffusers create thousands of tiny air bubbles which provide oxygen for the aerobic digestion process and mixes the compartment's entire contents. These tiny bubbles provide better air-to-liquid contact so as to hasten the aerobic digestion process. Aerobic bacteria then use the oxygen in solution to break down the wastewater so as to convert the wastewater into an odorless liquid and gas. Hydraulic displacement causes the mixture to enter the second and final compartment. Due to the calm conditions and sloping walls of the clarification compartment, any remaining settleable material is encouraged to return to the aeration compartment for further treatment. The remaining effluent, upon reaching the outlet piping, is clear and odorless.

During a comprehensive eight month testing program, conducted by Baylor University, in accordance with the National Sanitation Foundation (NSF) Standard 40, the HYDRO-FLO Wastewater Treatment System produced an excellent effluent having a quality easily falling under the NSF Class I requirements of less than 30 PPM Bod (5 day) with greater than 85% reduction and less than 30 PPM TSS (Total Suspended Solids) with greater than 85% reduction. The actual HYDRO-FLO test averages were 7.23 PPM Bod (5 day) with 96.04% reduction and 5.89 PPM TSS with 96.81% reduction. The HYDRO-FLO System produced a clear and odorless effluent. Offensive, embarrassing wastewater odors, which are a common problem with septic tanks, are substantially eliminated by the HYDRO-FLO System.

This HYDRO-FLO System allows homes to e build on clay soil, rock or high water tables. This system also helps to protect the ground water supplies and eliminates gross pollution of ditches and streams. The effluent discharged from such a system is allowed by some state and local regulatory agencies to be discharged directly to a stream or pond or used to surface irrigate lawns and pastures. In areas where surface discharge is not allowed, subsurface disposal methods can be used with good success.

The aforedescribed HYDRO-FLO System essentially utilizes an air pump having an air line extending into a fiberglass tank. A number of drop lines are in communication with the air line and extend downwardly into the tank. An orifice is formed at the bottom of the drop lines. The porous ceramic diffuser is positioned around the orifice. This system is conventionally used for twenty-four (24) hour per day usage. When loaded to the maximum designed flow rate, the air pump operates continually to deliver air supplies to the aeration compartment within the fiberglass tank. As long as the air supply continues, there is no need to prevent the flow of mixed liquors into the drop lines. In addition, there is no need to overcome head pressures from any liquids that may have accumulated within the drop lines. However, it has been found that, with low level usage, it is not necessary to continually operate the air pump of the wastewater treatment system. It has been found possible to cycle the air pump on and off during the day.

Whenever the wastewater treatment system employs a cycling air pump the drop lines will tend to accumulate liquids. If the air pump is off and if enough time is provided, the drop lines will be filled with the "mixed liquors" until such liquids reach the level of the liquid within the fiberglass tank. When the air pump cycles on, it is necessary to apply suitable air pressure to exert a force on the accumulated liquids so as to force the liquids through the orifice at the bottom of the drop line and through the porous ceramic diffuser. As the mixed liquors are continually entering and leaving the porous ceramic diffusers and the orifices, there will be a tendency for small particles within the mixed liquor to plug the diffusers and to impede the operation of the system. The generation of unnecessary air pressure to force the liquids from the drop lines will require excessive energy to operate the air pump and reduce air pump life. Eventually, the diffuser which receives the least amount of air pressure from the air pump will be the first to clog completely. Whenever one of the diffusers becomes plugged, then an uneven distribution of aeration occurs within the wastewater in the tank.

Check valves have been applied to a variety of applications. Check valves are quite common in the process industries and in the automotive industries. Essentially, a check valve allows the flow of air or liquid in one direction while preventing the return flow of such air and/or liquid. One particular type of check valve has been found in the prior art (as shown in FIG. 7 herein) which is suitable for allowing the flow of air in one direction while, at the same time, preventing the flow of liquid from the opposite direction. Also, the check valve, of this type is generally suitable for slowing the leakage of air pressure from the opposite direction.

After use and experimentation, it was found that such a check valve, while appropriate for the purposes of the present invention, allows a high velocity of air to pass through relatively small restricted openings. In general, the greater the velocity of the air passing through the holes, the greater the amount of deflection and abrasion of the flap valve. It has been fund desirable to reduce the velocity of air which flows through the check valve.

It is an object of the present invention to provide an aeration apparatus having a check valve for preventing the accumulation of water in the drop lines.

It is another object of the present invention to minimize the plugging of the porous ceramic diffusers of an aeration system.

It is another object of the present invention to provide an aeration apparatus in which a check valve is easily accessible and serviceable.

It is another object of the present invention to provide an aeration apparatus which minimizes deflection and abrasion of a flap on a check valve.

It is still another object of the present invention to provide an aeration apparatus that is suitable for use on intermittently cycling air pumps.

It is still a further object of the present invention to provide an aeration apparatus which reduces the loads on the air pump.

These and other objects and advantages of the present invention will become apparent from a reading of the attached specification and appended claims.

SUMMARY OF THE INVENTION

The present invention is an aeration apparatus for a wastewater treatment plant that comprises an air line connected to an air source, a drop line connected in fluid communication with the air line, a check valve positioned in the drop line, and a diffuser member extending around an orifice at the bottom of the drop line. The orifice is positioned adjacent an end of the drop line opposite the air line. The check valve serves to prevent liquid from passing therethrough. Initially, the check valve permits unidirectional flow of air from the air line to the orifice. The diffuser serves to produce a multitude of air bubbles.

The drop line specifically comprises a tube extending downwardly from the air line, an upper adapter fastened to an end of the tube opposite the air line, and a lower adapter engaging the upper adapter in fluid communication with the tube. The orifice is formed on the lower adapter. The check valve is positioned within the lower adapter above the orifice. Specifically, the upper adapter includes a male threaded member and the lower adapter has a female threaded connector. The female threaded connector is in sealed mating engagement with the male threaded member. The check valve is affixed within the lower adapter adjacent to the female threaded connector.

The check valve of the present invention comprises a disk having a plurality of holes extending therethrough and a resilient flap valve extending over the holes and juxtaposed against the disk. The resilient flap valve permits a unidirectional of air through the holes. The disk has a center point with the holes arranged radially around this center point. The disk has greater than four holes extending therethough. Each of the holes has a diameter of greater than 1/16th of an inch. A first gasket seal is positioned on one side of the disk and a second gasket seal is positioned on an opposite side of the disk. Each of these gasket seals are of a nylon-impregnated neoprene material. The disk is made of a rigid non-corroding plastic material. The check valve is positioned not more than 1¼" inches from the upper edge of the porous ceramic diffuser.

The diffuser member is a porous ceramic cylinder which is fitted in sealed engagement around the orifices on the lower adapter. As air is transmitted through the check valve and lower adapter, air passes outwardly from the orifices, through the diffuser, and is delivered to the mixed liquor in the wastewater treatment plant in a multitude of bubbles. The porous ceramic diffuser allows the formation of a large number of bubbles so as to maximize the surface area contact between the air and the mixed liquor.

DETAILED DESCRIPTION OF THE INVENTION

Figure 1:
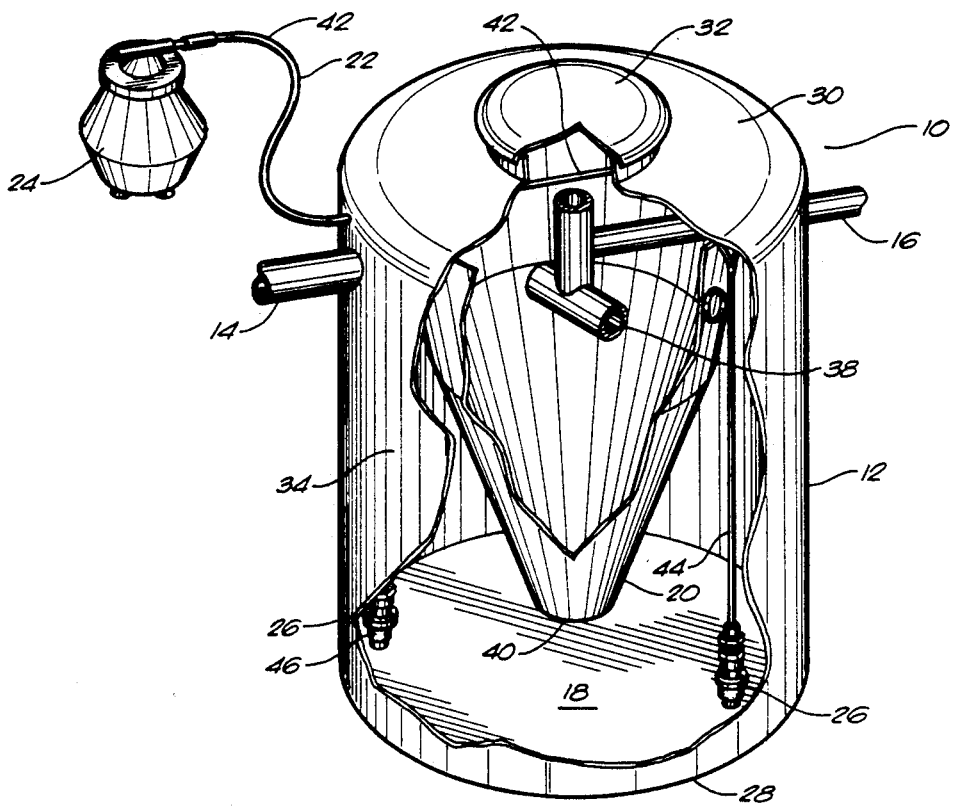
FIG. 1 is a perspective, partially cutaway, view of the wastewater treatment plant of the present invention.

Referring to FIG. 1, there is shown at 10 a wastewater treatment plant in accordance with the present invention. The wastewater treatment plant 10 includes a fiberglass tank 12, an inlet 14, an outlet 16, an aeration compartment 18, a clarification compartment 20, and an aeration apparatus 22. An air pump 24 is connected to the aeration apparatus 22 so as to supply air to the diffuser adapter assemblies 26 positioned within the aeration compartment 18 on the interior of the tank 12. The subject of the present invention concerns the configuration and use of the aeration apparatus 22 and the configuration of the diffuser adapter assemblies 26.

The tank 12 is made of fiberglass material. Alternatively, the tank 12 can also be made of a variety of other materials. The tank 12 has a bottom surface 28 and a top cover 30. The combination of the bottom 28 and the top 30 provides a sealed compartment for the receipt of wastewater. A removable access cover S2 is affixed to the top cover 30. Suitable screws, or other devices, are provided so as to resist tampering or unauthorized entry through the access cover 32.

The inlet 14 is a conduit that extends through the wall 34 of tank 12. Inlet 14 is typically connected to a sewage line from a house or a small commercial establishment. The inlet 14 opens to the aeration compartment 18 on the interior of tank 12.

The outlet 16 also extends through the wall 34 of tank 12. Outlet 16 allows the treated wastewater to be discharged in compliance with federal, state and local regulations. The outlet 16 includes an opening 38 positioned within the interior of the clarification compartment 20. As the treated wastewater enters the clarification compartment 20 and rises to the level of opening 38, then the treated wastewater can be discharged by passing through the wall 34 of tank 12 by way of outlet 16.

The aeration compartment 18 is formed on the interior of tank 12. Aeration compartment 18 receives the raw wastewater by way of the inlet 14. It is in this compartment 18 that the raw wastewater is mixed with the activated sludge and is aerated by way of the aeration apparatus 22. As the raw wastewater is mixed with oxygen in the aeration compartment 18, the aerobic bacteria uses the oxygen in solution so as to break down the wastewater and convert it to an odorless liquid and gas. As the aeration compartment 18 becomes full, hydraulic displacement will cause the mixture to enter the clarification compartment 20. The clarification compartment 20 has a generally inverted truncated conical configuration. The clarification compartment 20 includes an open end 40. This open end 40 allows the remaining settleable material to return to the aeration compartment 18 for further treatment. When the remaining effluent fills the clarification compartment 20, it will reach the outlet piping 16 so as to be discharged from the tank 12.

The principal feature of the present invention is the arrangement of the aeration apparatus 22. The aeration apparatus 22 includes the air pump 24, air line 42, drop lines 44 and the diffuser adapter assembly 26. The air pump 24 is suitable for causing compressed air to pass through the air line 42 into the interior of tank 12. A plurality of drop lines 44 are in fluid communication with air line 42. Air is then passed from the air line 42 into the drop lines 44. The diffuser adapter assemblies 26 are positioned at the bottom of drop line 44. A diffuser 46 is positioned adjacent the bottom of the diffuser adapter assembly 26. The diffuser 46 is a porous ceramic diffuser positioned adjacent to the bottom surface 28 of the tank 12. The diffusers create thousands of tiny air bubbles which provide oxygen for the aerobic digestion process and serves to mix the entire contents of the aeration compartment 18. A more complete description of the diffuser adapter assemblies is provided in connection with FIGS. 4 and 5 herein.

Figure 2:
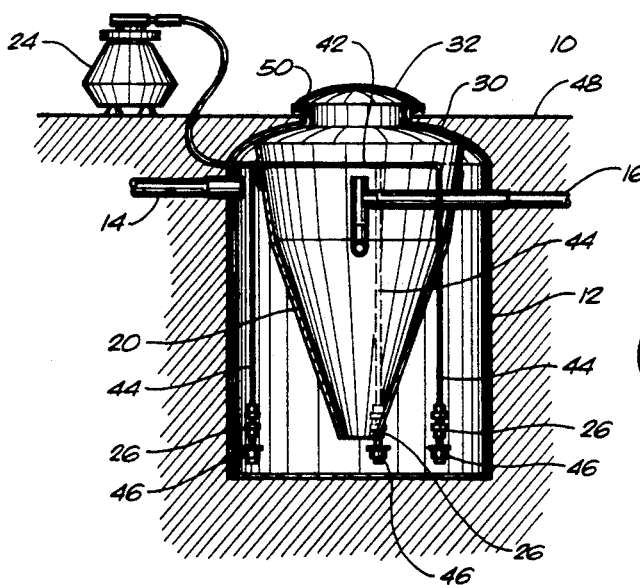
FIG. 2 is a cross-sectional view showing the wastewater treatment plant as installed within the ground.

Referring to FIG. 2, it can be seen how the wastewater treatment plant 10 of the present invention is installed into the earth 48. The tank 12 is positioned within earth 48 such that the cover 32 extends outwardly from the top surface of earth 48. Tamper-resistant screws 50 secure the access cover 32 to the top cover 30 of tank 12. The wastewater inlet 14 extends below the surface of the earth 48. The wastewater inlet 14 is generally joined to the sewage line from a house or small commercial business. The air line 42 extends into the interior of tank 12 so as to be connected, in fluid communication, with drop lines 44. The outlet 16 also extends through the wall of tank 12 and into the interior of the clarification compartment 20. The air drop lines 44 have diffuser adapter assemblies 26 connected at the lowermost end of the drop lines 44. Essentially, the air line 42 and the drop lines 44 are tubes which extend downwardly. Within the concept of the present invention, the air pump 24 can be cycled as required by the particular facility to which the wastewater treatment plant 10 is connected. In such a cyclical type of operation, the air pump 24 will intermittently provide a source of air for the air line 42 and the drop lines 44. When the air pump 24 is turned off, then there will be a tendency for any mixed liquor contained within the interior of tank 12 to pass into the diffuser adapter assemblies 26. As such, in the present invention, the diffuser adapter assemblies 26 and/or the drop lines 44 are provided with a check valve so as to prevent the infiltration of such mixed liquors and to resist the plugging of the air passageways. Additionally, the use of the check valve, as will be described hereinafter, effectively minimizes the amount of power required by and increases the life of the air pump 24 for the purpose of pushing water from the interior of the drop lines 44. In the preferred embodiment of the present invention, the check valve will be positioned within the diffuser adapter assemblies 26. However, within the scope of the present invention, such a check valve may also be included within the drop line 44 between the air line 42 and the diffuser 46.

Figure 3:
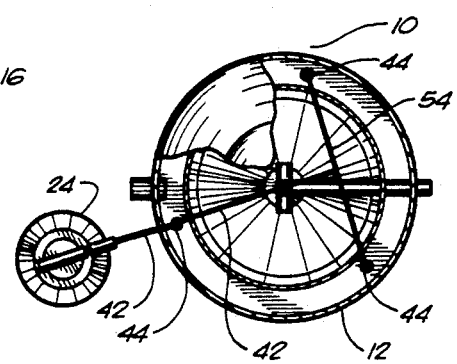
FIG. 3 is a partially cutaway plan view of the wastewater treatment plant of the present invention.

FIG. 3 shows a top interior configuration of the wastewater treatment plant 10 of the present invention. In particular, in FIG. 3, it can be seen that the air pump 24 delivers air through air line 42 into the interior of the tank 12. The drop lines 44 are arranged so as to be three in number and evenly spaced about the interior of the tank 12. Each of the drop lines 44 will be in fluid communication with the air line 42. Air line 42 joins with a T-branch 54 within the interior of tank 12.

Figure 4:
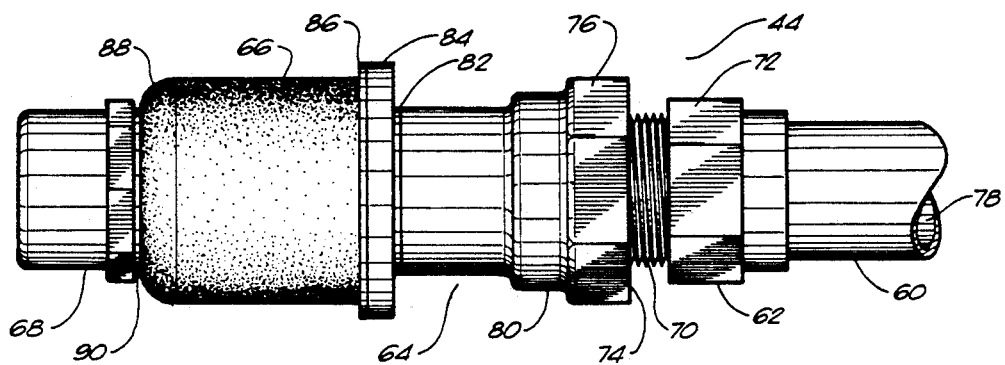
FIG. 4 is a side elevational view of the diffuser adapter assembly in accordance with the preferred embodiment of the present invention.

FIG. 4 shows the lowermost end of the drop line 44. Essentially, the drop line 44 comprises a tube 60, an upper adapter 62, and a lower adapter 64. The diffuser member 66 is connected to the lower adapter 64. A cap 68 is provided on the end of the drop line 44 so as to secure the diffuser member 66 in a proper position extending around an orifice positioned adjacent a bottom of the drop line 44.

Tubular member 60 is connected to the air line 42 so as to be in fluid communication therewith. The upper adapter 62 is positioned to an end of the tube 60 opposite the air line 42. The upper adapter 62 includes a male threaded portion 70 extending outwardly from bolt portion 72. The lower adapter 64 includes a female threaded opening 74 positioned at one end of the lower adapter 64. This female threaded opening 74 is suitable for receiving the male threads 70 on the upper adapter 62 in mating engagement.

The lower adapter 64 has an interior area in fluid communication with the interior 78 of the tubular member 60. As will be described hereinafter, a check valve is seated within area 80 of the lower adapter 64.

The diffuser 66 is a porous ceramic diffuser having a generally cylindrical configuration. A first gasket 82 is provided so as to extend around the exterior of the tubular interior 78. A ring 84, made of a polymeric material, is placed in juxtaposition against the gasket 82. Another gasket 86 is positioned in juxtaposition against a surface of the ring 84 opposite gasket 82. In this arrangement, one end of the porous ceramic diffuser 66 is placed in sealed engagement against the gasket 86.

The far end of the diffuser 66 curves inwardly at 88. Another elastomeric gasket 90 is positioned against this end of the diffuser 66. Cap 68 is threadedly affixed to the lower adapter 64 so as to properly compress the diffuser 66 against the gasket 86 and against the gasket 90. In this arrangement, the diffuser 66 will be positioned properly for the release of the air therethrough.

Figure 5:
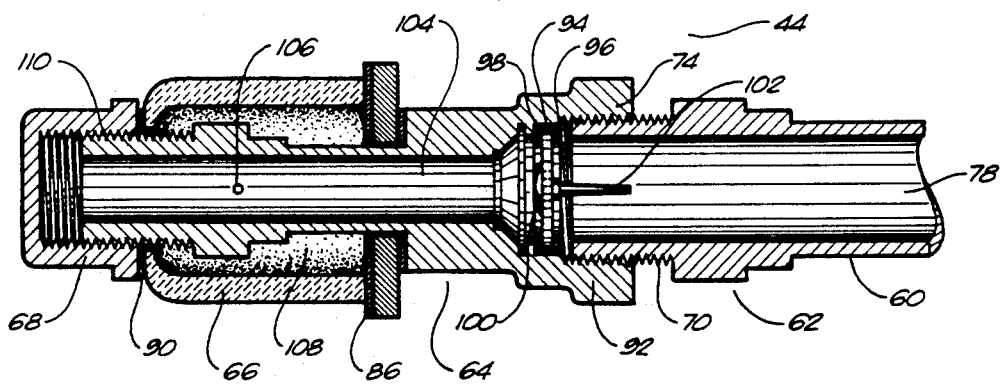
FIG. 5 is a cross-sectional view of the diffuser adapter assembly in accordance with the preferred embodiment of the present invention.

FIG. 5 shows an interior arrangement of the diffuser adapter portion of drop line 44. It can be sen that the tubular interior 78 extends downwardly through the tubular member 60 of the upper adapter 62. The male threads 70 engage the female threads 74 of the lower adapter 64. Check valve 92 is positioned adjacent to the female threads 64 within the tubular interior of the lower adapter 64. Check valve 92 is generally juxtaposed against the end of the male threaded portion 70 of the upper adapter 62.

The check valve 92 has a stylized configuration which is unique to the present invention. In particular, the positioning of the check valve 92 in the location shown in FIG. 5 is of particular importance. The check valve 92 includes a disk 94 which has a diameter generally conforming to the tubular interior of the lower adapter 64. This disk 94 is a generally rigid member having a plurality of holes extending therethrough. A more detailed illustration of this disk 94 is described in connection with FIG. 6. A first gasket seal 96 is positioned on one side of disk 94. A second gasket seal 98 is positioned on the opposite side of disk 94. As the upper adapter 62 threadedly engages the female opening 74 of the lower adapter 64, the end of the upper adapter 62 will compress the seals 96 and 98 such that the disk 94 is properly sealed within the interior of the lower adapter 64. A flap valve 100 is positioned on a side of the disk 94 opposite the upper adapter 62. The flap valve 100 is resilient and extends over the holes of the disk 94. Securement member 102 secures the flap valve 100 into its position relative to the disk 94. The securement member 102 is a flexible elastomeric member that has a portion extending toward the tubular interior 78 of the upper adapter 62. The check valve 92 allows for the unidirectional flow of air though the tubular interior 78 into the tubular interior 104 of the lower adapter 64. The configuration of the resilient flap valve 100, in relation to disk 94, prevents the flow of any liquids, including mixed liquors, into the tubular interior 78 of the upper adapter 62. In addition, the resilient flap valve 100 tends to resist the leakage of air pressure from the tubular interior 108 into the tubular interior 78 of the upper adapter 62.

In FIG. 5, it can be seen that the tubular interior 104 includes an orifice 106 formed therein. Orifice 106 allows air from the drop lines to pass outwardly from the lower adapter 64. As air passes outwardly from orifice 106, it enters into cavity 108 formed on the interior of the diffuser 66. The air will distribute about the cavity 108 and eventually migrate evenly outwardly through the porous surface of the diffuser 66. It can be seen that the end cap 68 is fastened to threads 110 at the bottom of the lower adapter 64. As the end cap 68 is rotated, it compresses the seals 86 and 90 so as to secure the adiffuser 66 in sealed engagement therebetween.

It is important to realize the significance of positioning the check valve 92 in proximity to the porous ceramic diffuser (within 1¼" inches). During the intermittent operation of a cycling air pump for the wastewater treatment plant, the mixed liquors contained within the tank 12 will have a tendency to migrate through the diffuser 66 and migrate into the orifice 106. As time passes, the mixed liquors will eventually fill the tubular interior 104 of the lower adapter 64. The use of the flap valve 100 on the check valve 92 prevents liquid from intruding into the tubular interior 78 of the upper adapter 62. In this manner, the liquid is maintained in the area of the tubular interior 104 of the lower adapter 64.

The use of the check valve of the present invention further resists the loss of air pressure from the interior 104. It normally takes between two and three p.s.i. of pressure so as to overcome the head pressure of the liquid within the tank 12. As long as this air pressure is maintained within the tubular interior 104, the air pressure will resist the intrusion of liquids into this interior. It is considered an ideal situation to be able to balance the air pressure within the tubular interior 104 with the head pressure of the liquid within the tank 12. The check valve 92 is particularly designed to keep air pressure from leaking from the tubular interior 104 into the tubular interior 78. It is designed to hold approximately two pounds of air pressure. As long as the check valve prevents air from backflowing, then the liquid will not enter into the orifice 106. However, when air leaks out, either through the aging of the flap valve 100, or by abrasion of the check valve disk 94, then the liquid will have a tendency to enter into the lower adapter 64. Fortunately, the configuration of the resilient flap valve 100 will prevent the liquid from entering into the tubular interior of the upper adapter 62.

When water does enter into the tubular interior 104, it is necessary for the air pump to exert a suitable force on the water so as to cause the water to backflow through the orifice 106 into the tank 12. The exertion of this amount of air pressure by the air pump can consume unnecessary electricity, can reduce the efficiency of the air pump, and can possibly reduce the life of the air pump.

The check valve 92 is placed into a serviceable location in the female opening 74 of the lower adapter 64. By locating the check valve in this position, the check valve 92 is placed as close as possible to the porous ceramic diffuser so as to avoid the build-up of larger volumes of liquid within the interior of the adapter. As more and more liquid accumulates, the amount of air pressure required to exhaust the liquid becomes greater.

It should also be kept in mind that the rate of plugging of the diffuser 66 will be in proportion to the volume of water which enters the interior 104 of the lower adapter 64. Plugging will occur sooner when a greater amount of the mixed liquor, and the small particles associated therewith, are allowed to enter through the diffuser 66. As such, the check valve 92 is positioned in a location so as to minimize the amount of mixed liquor that can possibly enter into the cavity 108 and the tubular interior 104. Since three diffusers are used in the wastewater treatment plant, the effects of plugging become more pronounced. As one diffuser becomes plugged, then a greater amount of air pressure will be distributed to the other diffusers. As a result, there is a tendency for one diffuser to become quickly plugged. If all of the diffusers are not functioning properly, then there becomes an uneven distribution of aeration within the wastewater treatment plant. Whenever a diffuse becomes plugged, then the efficiency of the wastewater treatment plant of the present invention in the treatment of wastewater is greatly reduced.

Figure 6:
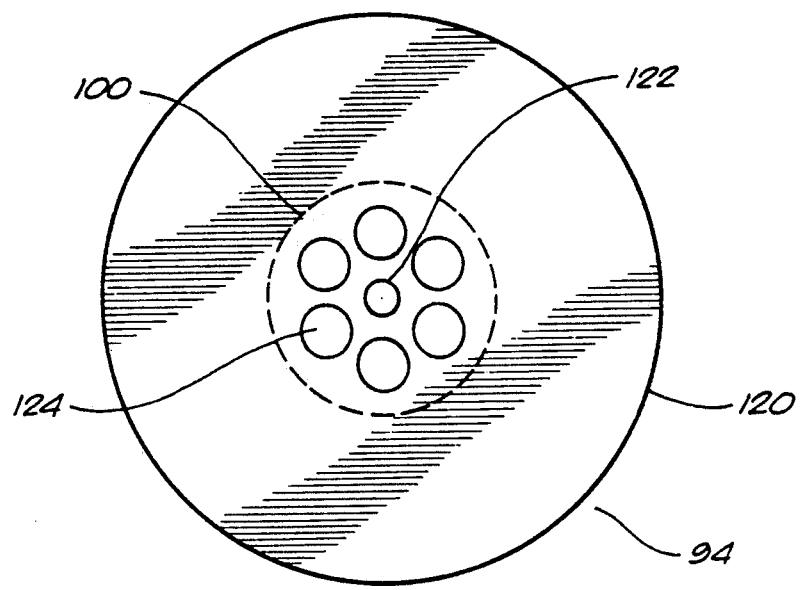
FIG. 6 is an isolated view, in side elevation, of the check valve of the present invention.

FIG. 6 is an isolated view of the disk 94. It an be seen that disk 94 has a circular periphery 120 which fits within the female threaded opening 74 of the lower adapter 64. The disk 94 has a center point 122. The flap valve, and its associated securement member 102 are fastened to the center point 122. A plurality of holes 124 extend radially around the center point 122. It can be seen that a total of six holes 124 are formed so as to extend through the disk 94. The disk 94 is made of a rigid plastic non-corrodible material. The flap valve 100 (as shown in dotted line fashion) extends around the holes 124 on the opposite side of disk 94. In relation to the illustration of FIG. 5, the gasket seals 96 and 98 are made of a nylon-impregnated neoprene material. By using such a material for the gasket seals, the male adapter 62 can be joined to the female adapter 64 in a tight fashion without having the gasket seals deflect the disk 94 or distort between the threads. The nylon-impregnation of the gasket seals further prevents the deterioration of such seals over time. The gasket seals 96 and 98 extend around the periphery of the disk 94.

Figure 7:
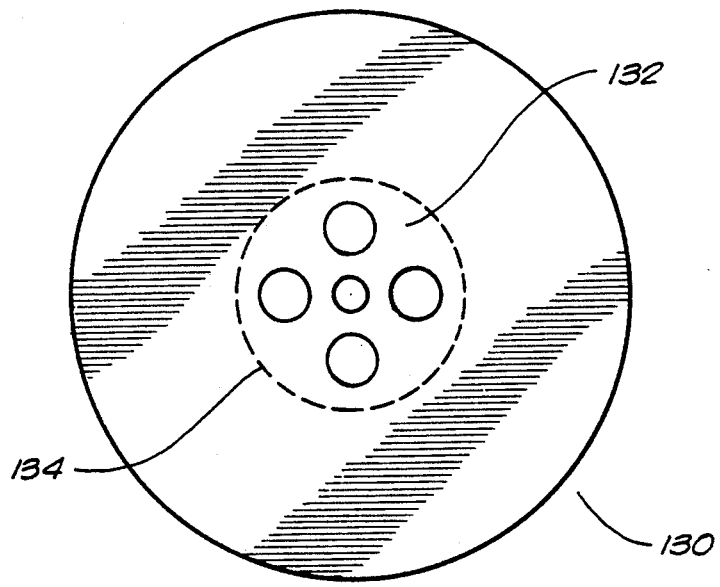
FIG. 7 is an isolated side elevational view of a check valve of the prior art.

With respect to FIG. 6, the present invention employs six holes 124 having a diameter of greater than 1/16th of an inch. The number of holes, along with the size of the holes, tends to reduce the velocity of the air flow through the holes and pass the flap valve 100. FIG. 7 shows a prior art-type of check valve 130. This prior art-type of check valve 130 has four holes 132, having a diameter of 1/16th of an inch or less, extending therethrough. Flap valve 134 extends around these four holes 132. Each of the holes 124 of the present invention has an area which is fifty percent greater than the area of each of the holes 132 of the prior art-type of check valve. The disk 130 was made of a corrodible aluminum material.

The use of the six holes 124, of the present invention, is properly sized for the volume of air passing through the drop line 44. By using more holes and holes of greater size, the air passing through the holes will be of a lower velocity. By reducing this velocity, the flap valve will be displaced much more gently, and over a larger surface area, than does the four-hole configuration of the prior art. It has been found that the rate of deterioration of the flap valve will be a function of the velocity of the air passing through the holes. As air of greater velocity is passed through the flap valve, any particles contained within the air will tend to have a "sandblasting" effect upon the flexible rubberized flap valve. It has also been found that the four-hole configuration of the prior art will tend to lift four distinct areas of the flap valve, rather than lift the entire flap valve. As a result, the flap valve of the prior art will develop a roughly corrugated appearance. This has a greater tendency toward leakage and failure than does the flap valve and disk arrangement of the present invention.

The present invention offers a number of features which are an improvement over the prior art. First, the present invention enables the intermittent cyclical operation of the air pump. The use of the check valve prevents the backflowing of the mixed liquors upwardly and into the drop line. The arrangement of the check valve enhances the ability to avoid a plugging of the diffusers and also enhances the life and efficiency of the air pump. The use of the particular configuration of the check valve enhances the life of the check valve and the environment in which the check valve is placed.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An aeration apparatus for a wastewater treatment plant comprising:
   an air line connected to an air source and extending therefrom;
   a drop line connected in fluid communication with said air line, said drop line having an orifice adjacent an end of said drop line opposite said air line, said drop line comprising:
   a tube extending downwardly from said air line;
   an upper adapter positioned at an end of said tube opposite said air line; and
   a lower adapter engaging said upper adapter in fluid communication with said tube, said orifice formed in said lower adapter;
   a check valve means positioned in said drop line between said orifice and said air line, said check valve means for preventing liquid from passing therethrough, said upper adapter having a male threaded member, said lower adapter having a female threaded opening, said female threaded opening in sealed mating engagement with said male threaded member, said check valve means affixed within said lower adapter adjacent said female threaded opening; and
   a diffuser member extending around said orifice.

2. The aeration apparatus of claim 1, said check valve means positioned within said lower adapter above said orifice.

3. The aeration apparatus of claim 1, said check valve means positioned not more than one and one-fourth inches from an upper edge of said diffuser member.

4. The aeration apparatus of claim 1, said check valve means comprising:
   a disk having a plurality of holes extending therethrough; and
   a resilient flap valve extending over said holes and juxtaposed against said disk, said resilient flap valve for permitting a unidirectional flow of air through said holes.

5. The aeration apparatus of claim 4 said disk having a center point, said holes arranged radially around said center point, said disk having greater than four holes extending therethrough.

6. The aeration apparatus of claim 4, each of said holes having a diameter of greater than 1/16th of an inch.

7. The aeration apparatus of claim 4, said check valve means further comprising:
   a first gasket seal positioned on one side of said disk; and
   a second gasket seal positioned on an opposite side of said disk, said first and second gasket seals being of a nylon-impregnated neoprene material.

8. The aeration apparatus of claim 4, said disk being of a rigid plastic material.

9. A diffuser assembly for connection to an aeration system for a wastewater treatment plant comprising:
   an adapter having a first end for joining to the aeration system, said adapter having an orifice distal said first end;
   a diffuser member connected to said adapter and extending around said orifice; and
   a check valve positioned within said adapter between said first end and said orifice, said check valve for preventing liquid from passing therethrough, said check valve comprising:
- a disk having a plurality of holes extending therethrough, said disk having a center point, said holes arranged radially around said center point, said disk having greater than four holes extending therethrough, each of said holes having a diameter of greater than 1/16th of an inch; and
- a resilient flap valve extending over said holes and juxtaposed against said disk, said resilient flap valve for permitting a unidirectional flow of air through said holes.

10. The diffuser assembly of claim 9, said check valve further comprising:
- a first gasket seal positioned on one side of said disk; and
- a second gasket seal positioned on an opposite side of said disk, said first and second gasket seals being of a nylon-impregnated neoprene material.

11. The diffuser assembly of claim 9, said check valve positioned not more than one and one-fourth inches from an upper edge of said diffuser member.

12. The diffuser assembly of claim 9, said first end of said adapter having a female thread therein, said female thread for joining to a male connector of the aeration system.

13. The diffuser assembly of claim 12, said check valve affixed within said adapter adjacent said female thread, said check valve in sealed connection with said adapter.

14. A diffuser adapter assembly for connection to an adapter of a wastewater treatment plant comprising:
- a male adapter having means thereon for connection to the adapter;
- a female adapter in sealed engagement with said male adapter, said female adapter having an interior in fluid communication with said male adapter, said female adapter having an orifice formed therein;
- a check valve affixed within said female adapter between said male adapter and said orifice, said check valve permitting air from said male adapter to flow therethrough to said orifice; and
- a diffuser positioned on said female adapter so as to extend around said orifice, said diffuser positioned wholly below said check valve, said check valve positioned not more than one and one-fourth inches from an upper edge of said diffuser.

15. The diffuser adapter assembly of claim 14, said check valve comprising:
- a disk extending around said interior of said female adapter adjacent said male adapter, said disk having a plurality of holes extending therethrough; and
- a resilient flap valve extending over said holes and juxtaposed against said disk on a side of said disk opposite said male adapter, said resilient flap valve for preventing a liquid from passing through said holes toward said male adapter.

* * * * *